United States Patent
Mustafi (10) Patent No.: US 11,403,457 B2
(45) Date of Patent: Aug. 2, 2022

(54) PROCESSING REFERRAL OBJECTS TO ADD TO ANNOTATED CORPORA OF A MACHINE LEARNING ENGINE

(71) Applicant: salesforce.com, inc., San Francisco, CA (US)

(72) Inventor: Joy Mustafi, Hyderabad (IN)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/549,846

(22) Filed: Aug. 23, 2019

(65) Prior Publication Data

US 2021/0056164 A1    Feb. 25, 2021

(51) Int. Cl.
   *G06F 40/169* (2020.01)
   *G06N 20/00* (2019.01)
   *G06F 16/955* (2019.01)
   *G06V 10/22* (2022.01)

(52) U.S. Cl.
   CPC .......... *G06F 40/169* (2020.01); *G06F 16/955* (2019.01); *G06N 20/00* (2019.01); *G06V 10/225* (2022.01)

(58) Field of Classification Search
   None
   See application file for complete search history.

(56) References Cited

U.S. PATENT DOCUMENTS

| | | | |
|---|---|---|---|
| 7,730,478 B2 | 6/2010 | Weissman | |
| 7,779,039 B2 | 8/2010 | Weissman et al. | |
| 8,352,857 B2 | 1/2013 | Filippova et al. | |
| 9,224,103 B1* | 12/2015 | Subramanya | G06N 20/00 |
| 9,330,084 B1 | 5/2016 | Kadambi et al. | |
| 9,430,557 B2 | 8/2016 | Bhat et al. | |
| 9,430,558 B2 | 8/2016 | Bhat et al. | |
| 9,460,075 B2 | 10/2016 | Mungi et al. | |
| 9,495,355 B2 | 11/2016 | Mungi et al. | |
| 9,514,185 B2 | 12/2016 | Mungi et al. | |
| 9,535,894 B2 | 1/2017 | Carrier et al. | |

(Continued)

OTHER PUBLICATIONS

Roy, Arpita, Youngja Park, and Shimei Pan. "Learning domain-specific word embeddings from sparse cybersecurity texts." arXiv preprint arXiv:1709.07470 (2017). (Year: 2017).*

(Continued)

*Primary Examiner* — Frank D Mills
(74) *Attorney, Agent, or Firm* — Haynes and Boone, LLP (57) ABSTRACT

A system is provided for referral object processing for textual annotations. The system comprises a memory storing machine executable code and one or more processors coupled to the memory and configurable to execute the machine executable code to cause the one or more processors to parse a document to identify a reference identifier to an external object, the external object associated with information not contained in the document, retrieve the external object using the reference identifier, extract the information associated with the external object based on at least one data pattern detected in the external object, convert the extracted information into textual annotations associated with the reference identifier in the document, and enter the textual annotations to a corpus of content for the document so that the extracted information is associated with the reference in the document for the system.

21 Claims, 7 Drawing Sheets

(56) References Cited

U.S. PATENT DOCUMENTS

| | | | |
|---|---|---|---|
| 9,613,091 | B2 | 4/2017 | Mungi et al. |
| 9,684,876 | B2 | 6/2017 | Agarwalla et al. |
| 9,916,303 | B2 | 3/2018 | Mungi et al. |
| 10,102,276 | B2 | 10/2018 | Joshi et al. |
| 10,133,732 | B2 | 11/2018 | Mungi et al. |
| 10,275,712 | B2 | 4/2019 | Bhat et al. |
| 10,275,713 | B2 | 4/2019 | Bhat et al. |
| 10,318,641 | B2 | 6/2019 | Mustafi et al. |
| 10,417,581 | B2 | 9/2019 | Agarwalla et al. |
| 10,426,551 | B2 | 10/2019 | Gupta et al. |
| 10,489,229 | B2 | 11/2019 | Mustafi et al. |
| 10,521,513 | B2 | 12/2019 | Mustafi et al. |
| 2007/0239704 | A1* | 10/2007 | Burns .................. G06F 16/951 |
| 2010/0049772 | A1 | 2/2010 | Jing et al. |
| 2014/0195540 | A1* | 7/2014 | Brown .................. G06F 16/382 707/740 |
| 2015/0286629 | A1* | 10/2015 | Abdel-Reheem ..... G06F 40/295 704/9 |
| 2016/0292153 | A1 | 10/2016 | Agarwalla et al. |
| 2016/0314104 | A1* | 10/2016 | Phillips ............... G06F 16/9558 |
| 2017/0039192 | A1 | 2/2017 | Mustafi et al. |
| 2017/0052985 | A1 | 2/2017 | Guggilla et al. |
| 2017/0052988 | A1 | 2/2017 | Guggilla et al. |
| 2018/0137090 | A1* | 5/2018 | Duan ...................... G06F 40/30 |
| 2018/0160894 | A1 | 6/2018 | Gupta et al. |
| 2019/0362265 | A1 | 11/2019 | Agarwalla et al. |
| 2020/0134005 | A1* | 4/2020 | Mitra ...................... G06F 16/34 |
| 2020/0192979 | A1* | 6/2020 | Liu .......................... G06F 17/18 |

OTHER PUBLICATIONS

Su, X., Prasad, A., Kan, M.Y. and Sugiyama, K., Jun. 2019. Neural multi-task learning for citation function and provenance. In 2019 ACM/IEEE Joint Conference on Digital Libraries (JCDL) (pp. 394-395). IEEE. (Year: 2019).*

Bergmark, Automatic Extraction of Reference Linking Information from Online Documents, Cornell Digital Library Research Group, CSTR 2000-1821 pp. 1-20.

Bradbury et al., "Quasi-Recurrent Neural Networks," Cornell University Library, Under review as a conference paper at ICLR 2017, submitted Nov. 5, 2016, arXiv:1611.01576v2, pp. 1-11.

Day et al., "Reference Metadata Extraction using a Hierarchical Knowledge Representation Framework," ScienceDirect, Decision Support Systems 43, 2007, pp. 152-167.

Groza et al., "Reference Information Extraction and Processing using Random Conditional Fields. Information Technology and Libraries," Information Technology and Libraries, Jun. 2012, ISSN:2163-5226, pp. 6-20.

Han et al., "Deep Pyramidal Residual Networks," arXiv:1610. 02915, Oct. 10, 2016, pp. 1-9.

He et al., "Deep Residual Learning for Image Recognition," arXiv:1512. 03385, Dec. 10, 2015, pp. 1-8.

Hu et al., "Squeeze-and-Excitation Networks," arXiv preprint arXiv:1709.01507, Sep. 5, 2017, pp. 1-11.

Iandola et al., "DenseNet: Implementing Efficient ConvNet Descriptor Pyramids," Technical Report, University of California, Berkeley, arXiv preprint arXiv:1404.1869, Apr. 7, 2014, pp. 1-11.

Lankes, "MacArthur Foundation funds 'Reference Extract' to draw on librarians' expertise and add credibility to Web search experience," from https://davidlankes.org/macarthur-foundation-funds-reference-extract-to-draw-on-librarians-expertise-and-add-credibility-to-web-search-experience/, retrieved Nov. 26, 2019, pp. 1-5.

* cited by examiner

PROCESSING REFERRAL OBJECTS TO ADD TO ANNOTATED CORPORA OF A MACHINE LEARNING ENGINE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to database and machine learning systems, and more specifically to a system and method for identifying a referral identifier in a document for extraction of a referral object and addition of the referral object to textual annotated corpora having the document.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database system can store data or information. In a customer relationship management (CRM) database, for example, this data or information can include help manuals, written articles, assistance requests and solutions, and other materials. Other systems may store other types of documents that include content of relevance to particular users. This data and information in a database system can be stored in the form of electronic records or digital objects. When a user is interested in accessing data or information stored by database system that is related to a specific document, the user typically submits a search query, which may include a statement of importance to the user entered using a search bar, voice interface, or similar user interface tool. The database system responds with a query result for one or more search results, which may identify documents and/or text within documents based on the submitted query. However, search systems typically only search the text and content of the document. The search systems do not identify other content that may be referenced by a document but not directly included within the document, such as a link to another resource or object external to the document.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a database system accessible by a plurality of separate organizations, such as a multi-tenant database system, methods, data structures, and systems are provided for processing referral objects to add to annotated corpora for a machine learning engine. The database system stores multiple documents that are accessible by users of the database system, referred to as a corpus of documents or corpora of documents. The documents may be generated, for example, by users or administrators (e.g., agents of an organization) of the database systems based on input, articles, requests, and other documents that may provide some information, such as a help request, a training manual, pamphlets or other articles about a subject that provide information. At least some documents stored by the database system are associated with reference identifiers to external objects and information not contained within the document itself or some portion of the document (e.g., external to the document or contained within another portion of the document). Thus, a database system for customer relationship management (CRM) may store case objects, training material, and help information associated with customers of the CRM system based on input from agents, administrators, and customers.

The embodiments described herein provide methods, computer program products, and computer database systems for external object identification and processing for documents using machine learning techniques. An online system provides users with access to online services. For example, the online system may be a web-based CRM system that provides employees of an enterprise with access to CRM software applications. As part of providing the services to users, the online system stores corpora of documents that are accessible by users of the online system and searchable using a trained machine learning process or other search engine, such as a natural language processor. The corpora of documents may be generated, for example, by users or administrators of the online system based on input and identification of documents.

According to some embodiments, in a multi-tenant database system accessible by a plurality of separate and distinct organizations, a neural network model is provided for processing reference identifiers, links, and the like to extract information from external objects and add it to searchable annotations within the corpora of documents, taking into account the specificities of each document, thereby enhancing the experience of users associated with the organization.

Example Environment

The system and methods of the present disclosure can include, incorporate, or operate in conjunction with or in the environment of a database, which in some embodiments can implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users.

Figure 1:
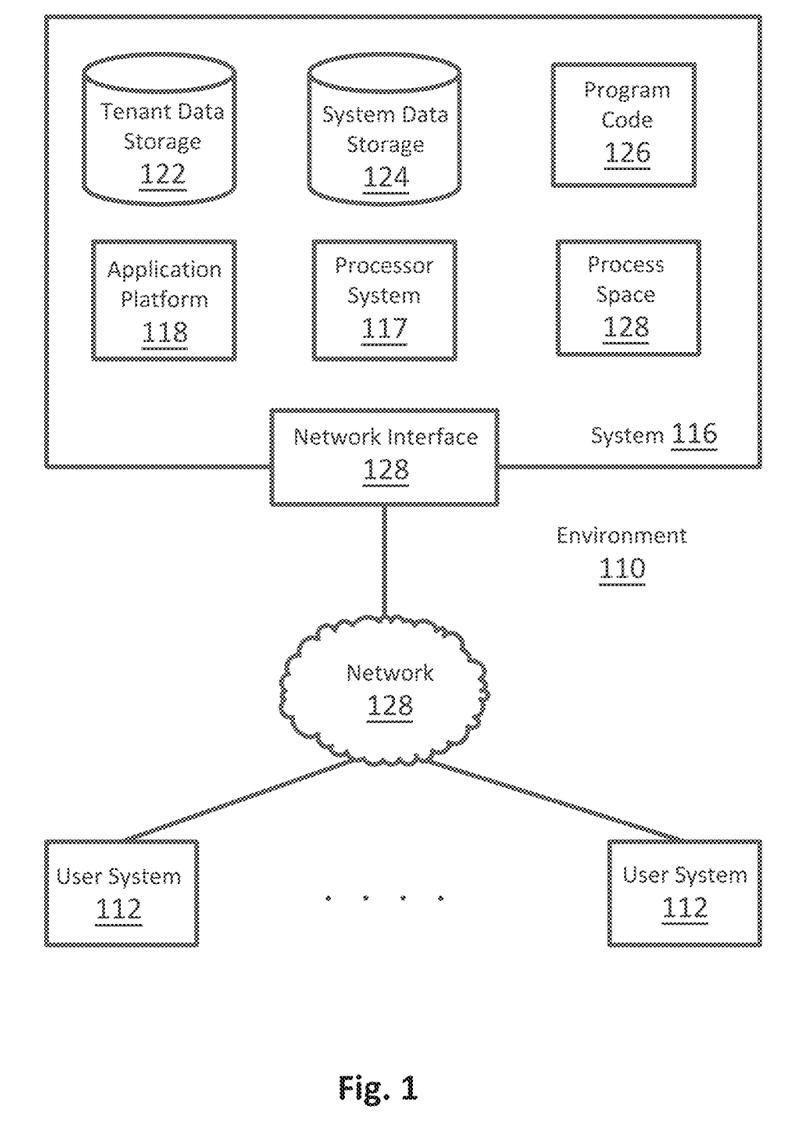
FIG. 1 illustrates a block diagram of an example environment wherein systems and methods for predicting entities for database query results may be used according to some embodiments.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular one of user systems 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/ in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented data base management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
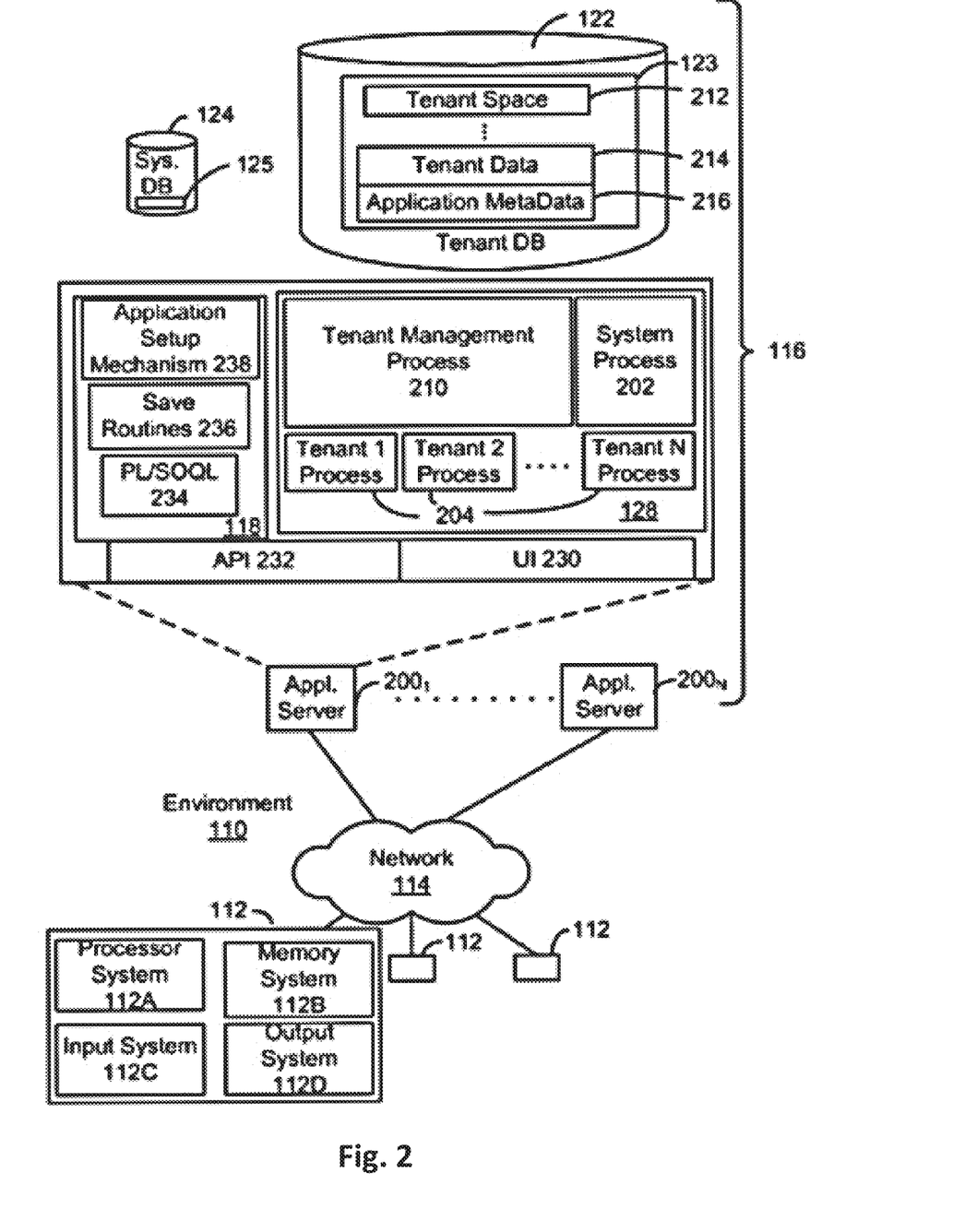
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short-term, and/or long-term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process and/or provide information to other users, agents, and administrators, which may be searchable. Thus, a user might maintain contact data, leads data, customer follow-up data, performance data, goals and progress data, training material, research articles, etc., all applicable to that user (e.g., in the tenant data storage 122). In an example of a MTS arrangement, since all of the data and the applications to access, view, modify, report, transmit, calculate, etc., can be maintained and accessed by a user system having nothing more than network access, the user can manage his or her information from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. In other embodiments, such as a natural language processor or machine learning engine, other types of searches may be performed based on input data. The system data storage 124 may generate query plans to access the requested data from the database, which may include external objects based on references to the objects within a document.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a customer relationship management (CRM) system, for example, these categories or groupings can include various standard tables associated with corpora of documents, such as listings of documents belong to a corpus, as well as information associated with searching those corpora submitted to the system (e.g., textual annotations of documents based on external objects referred to in a document). For example, a CRM database may include a table that describes a corpus of documents (e.g., one or more documents that may be searched for a subject or the CRM system itself), and may include reference identifiers in documents to external documents or objects that are not directly contained within the document or a portion of the document (e.g., a table, image, heading, banner, description box, and the like). In some multi-tenant database systems, tables and documents in a database might be provided for use by all tenants or may be only viewable by some tenants and agents (e.g., users and administrators) of the system.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 116 described above may be accessed and used by a number of customers, clients, or other persons (generally, "users"), regarding an inquiry, problem, question, issue, support-related matter, training or education, etc. that may correspond to searches. However, in other embodiments, other types of search systems may also utilize the processes described herein to generate textual annotations for a document of external objects referenced by the document. To facilitate interaction between the database system 116 and the user, a search bar, voice interface, or similar user interface tool is provided. The search tool allows a user to query the database to access information or data concerning or relating to various documents, objects, and/or entities relevant to the user.

For large databases with many records and information, however, there may be large amounts of documents where some or all of the documents include references to other portions of the documents, other objects located elsewhere, or other "external" objects of a document's text (e.g., an image, quotation, description box, table, website, or other data object that may not be contained directly in the text or information for a portion of the document). For example, a document may include a reference identifier that references an object and is used to locate the object, such as a hyperlink, a page identifier, a heading, a location identifier, an image, a callout banner, or a table. When searching the document, natural language processing or other search technique (e.g., a machine learning system trained using character or word embeddings or vectors) may only search the content of the document and may fail to locate the external object and provide search results including the external object. Thus, a database system's search index data may not be an accurate basis to predict proper search results for a search query. It is a difficult task to predict and order search results for searches performed by users that may include documents having references to external objects because the data in the external objects may be important to a search result. In a multi-tenant system, such as Salesforce.com, documents may refer to other documents, customers, agents, or external data. Continuing with the example, because the user may be most interested in relevant search results for a query having all returned data, for optimal or enhanced user experience, it may be desirable or preferable that the database system predict the documents and external objects that are most relevant or applicable to a user's search or query so that the desired information or data is presented to the user in the fewest number of keystrokes, mouse clicks, user interfaces, etc. As such, according to some embodiments, systems and methods are provided for predicting and returning search results having additional information from references to external objects in a document is provided based on textual annotations of the document from the external objects.

Textual Annotation Model

According to some embodiments, in a multi-tenant database system accessible by a plurality of separate and distinct organizations, such as system 116 shown and described with respect to FIGS. 1 and 2, a textual annotation model is provided for annotating documents and/or corpora of document with textual annotations for an intelligent search process which provides results returned that are most relevant for a given query into the database, taking into account the external references within the documents of a corpus or corpora, thereby providing for enhanced user experience.

Figure 3:
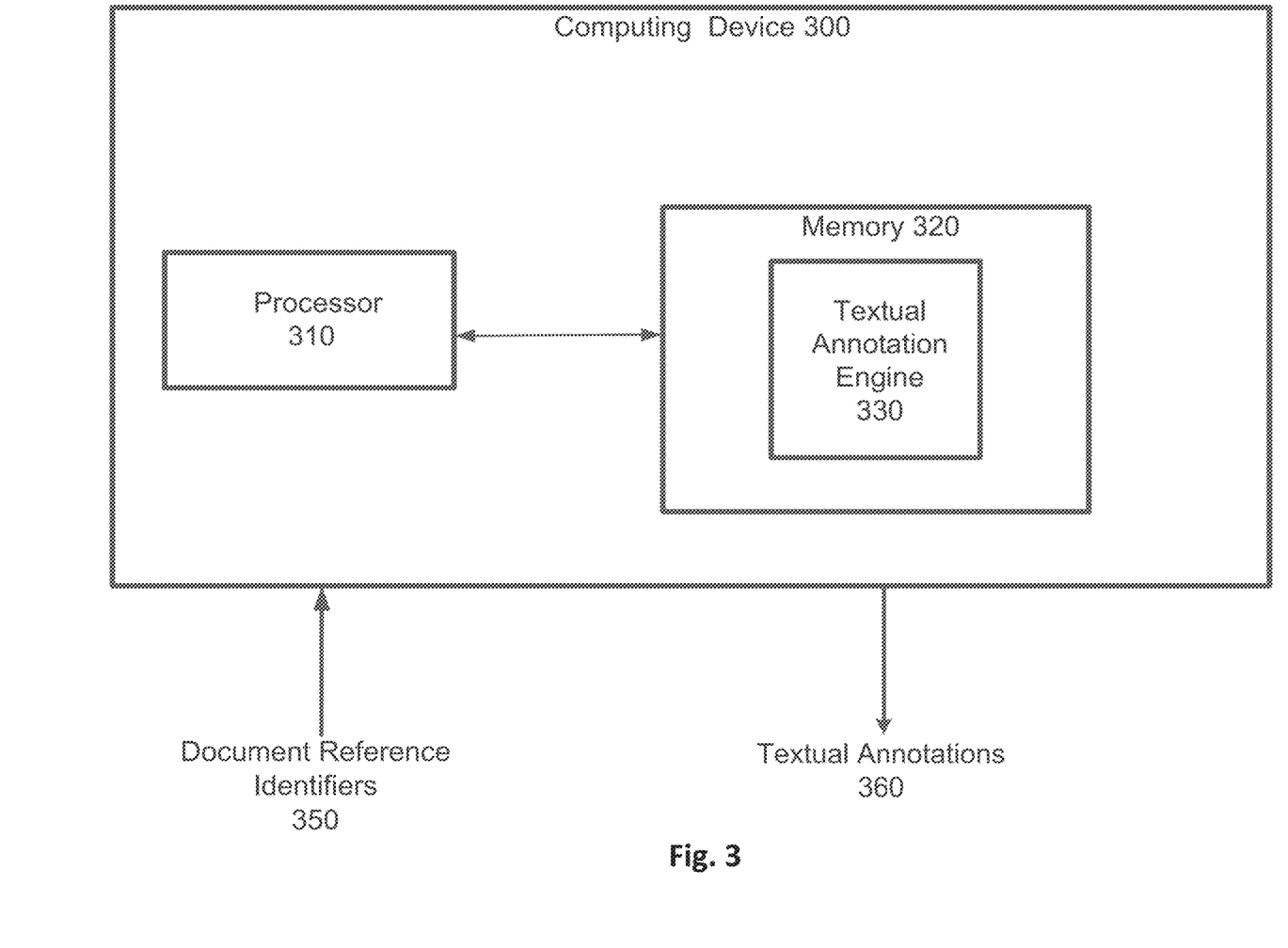
FIG. 3 illustrates a block diagram of an exemplary computing system for generating textual annotations of a document having references to external objects according to some embodiments.

FIG. 3 illustrates a block diagram of an exemplary computing system for generating textual annotations of a document having references to external objects according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities. In some examples, memory 320 may include non-transitory, tangible, machine readable media that includes executable code that when run by one or more processors (e.g., processor 310) may cause the one or more processors to perform any of the methods described further herein.

As shown, memory 320 includes a textual annotation engine 330, which may be used to generate textual annotations of documents based on the documents' references to external objects. Such textual annotations may be added to corpora having the documents so that the textual annotations and external objects may be searched as well during a search of the corpora's documents. Additional the textual annotations may be used when training a machine learning engine or neural network for searches using natural language processing or other process by converting the textual annotations to word vectors, embeddings, or other data. Neural networks have demonstrated great promise as a technique for automatically analyzing real-world information with human-like accuracy. In general, neural network models receive input information and make predictions based on the input information. For example, a neural network classifier may predict a class of the input information among a predetermined set of classes. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications. The neural network may include a multi-layer or deep neural network. According to some embodiments, the textual annotation engine 330 may generate textual annotations of a document by extracting data from external objects located using reference identifiers in the document. This is described in more detail below.

Figure 4A:
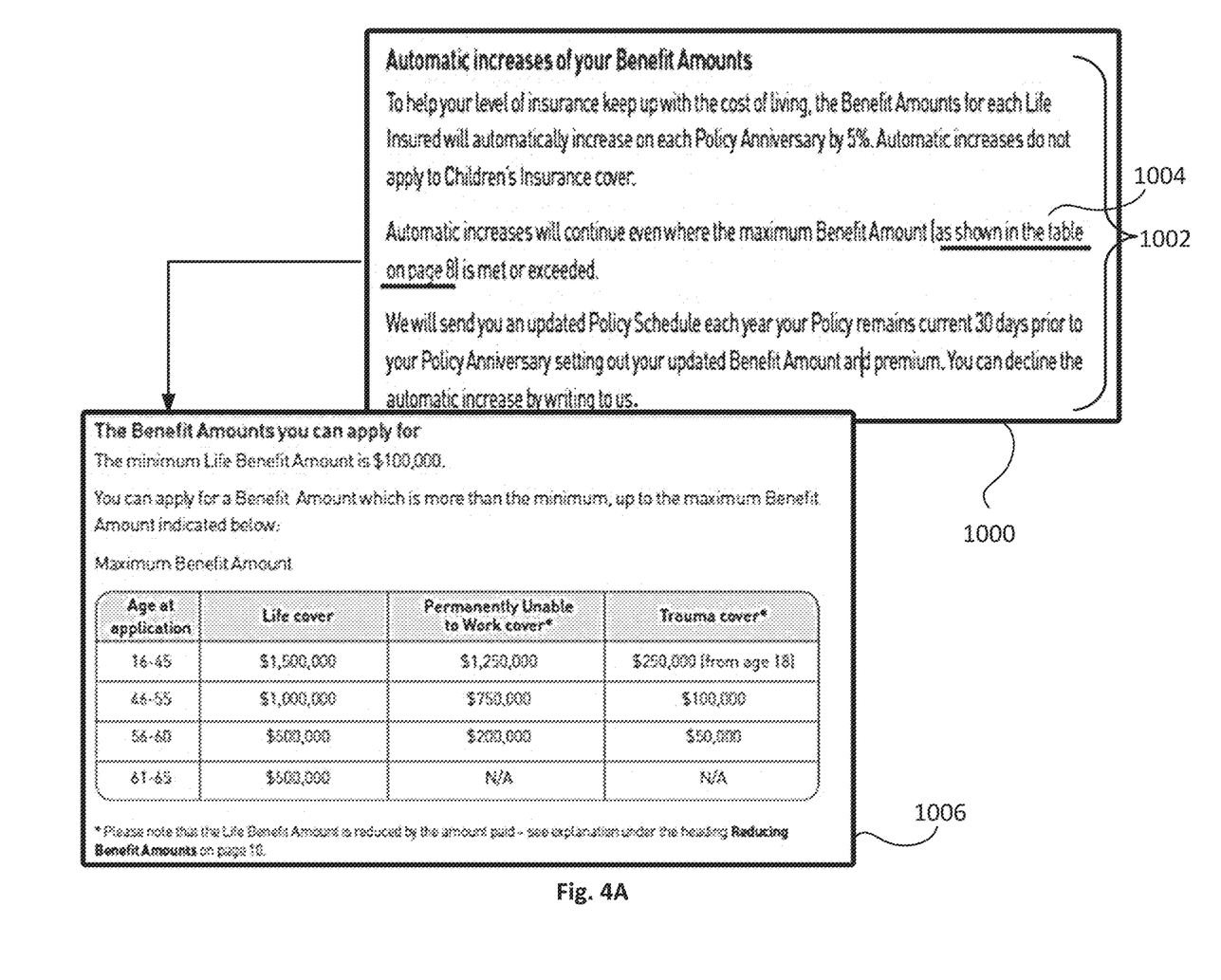
FIGS. 4A and 4B illustrates a simplified diagram of exemplary documents having reference identifiers to external objects according to some embodiments.
Figure 4B:
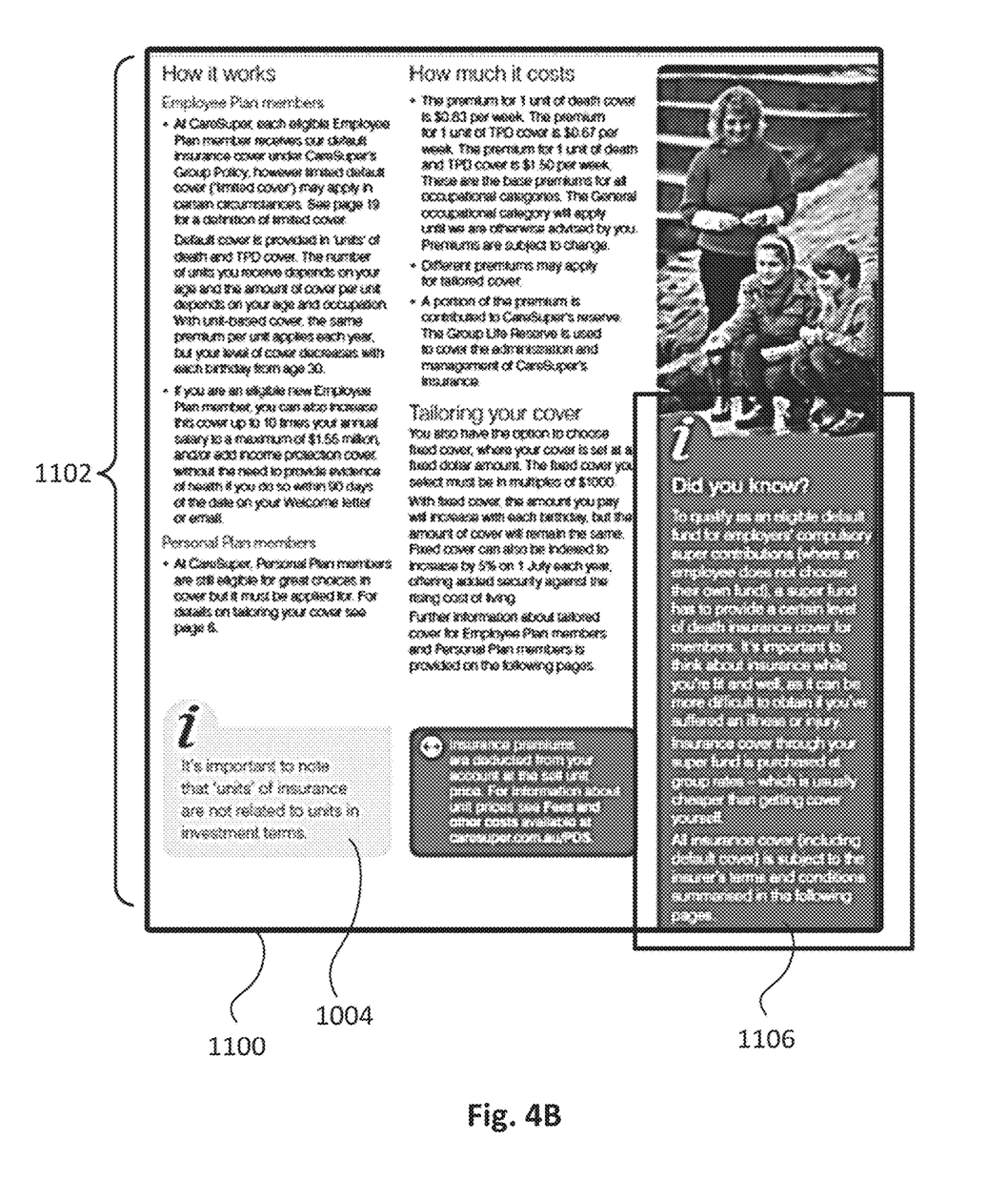

After training of the textual annotation engine 330, in some embodiments, the neural model implemented based further on textual annotations of documents by textual annotation engine 330 is global for the multi-tenant database system, such as system 116, and applied to or used for all organizations or tenants whose users make queries into the database. Computing device 300 may receive or intake a document having document reference identifiers (e.g., "See table 4.1," a hyperlink, a footnote or citation, an appendix location, etc.). The document reference identifiers 350 can be data in that it can take the form of words, a phrase, images, videos/audio, website data, or other extractable data. In some embodiments, the input sequence for a reference identifier is not constrained, restricted, or required to be in a particular form or limited to a particular set of words, phrases, or vocabulary. An example of textual input (e.g., documents having reference identifiers) according to some embodiments is shown in FIGS. 4A and 4B. The computing device 300 can receive the document reference identifiers 350 through a user interface or through receipt of data for a corpus of documents, such as by accessing a database having a corpus of documents including documents that have document reference identifiers 350. The computing device 300, using the model of textual annotation engine 330, generates textual annotations 360, which are extracted text that annotates documents having document reference identifiers 350 in the database. Thus, for a document having one or more reference identifiers to external objects, data from those external objects may be extracted to generate one or more of textual annotations 360, which annotate the document at locations for the reference identifier(s) with text from the external objects.

According to some embodiments, the functionality of the computing device 300, including textual annotation engine 330, may be implemented or incorporated in a Search Model Service (SMS) plugin. SMS is a gRPC microservice that hosts and executes machine learning models. SMS takes in parameters via a Protobuf file, and executes models using those input parameters. SMS returns a response back to the client (e.g., user device) according to the response parameters defined. In some embodiments, the SMS implementation runs on an environment for containerized applications (e.g., Salesforce Application Model (SAM)) that is separate or independent from the core applications of the multi-tenant database system, such as system 116. SMS may provide for faster deployment of the model. SMS also provides for isolation/containerization of Java virtual machines (JVMs), so that a crash related to its model execution will not impact or affect the application servers of the database system. The SMS plugin is isolated code that can initialize the model data for a particular model type, perform model-specific feature processing, and execute model based on feature vectors and other parameters. The plugin architecture provides various advantages, including that changes can be made to plugin code without making changes to model executor code, and that concerns about load balancing, routing, and parallelizing are reduced or eliminated with plugins.

Figure 5:
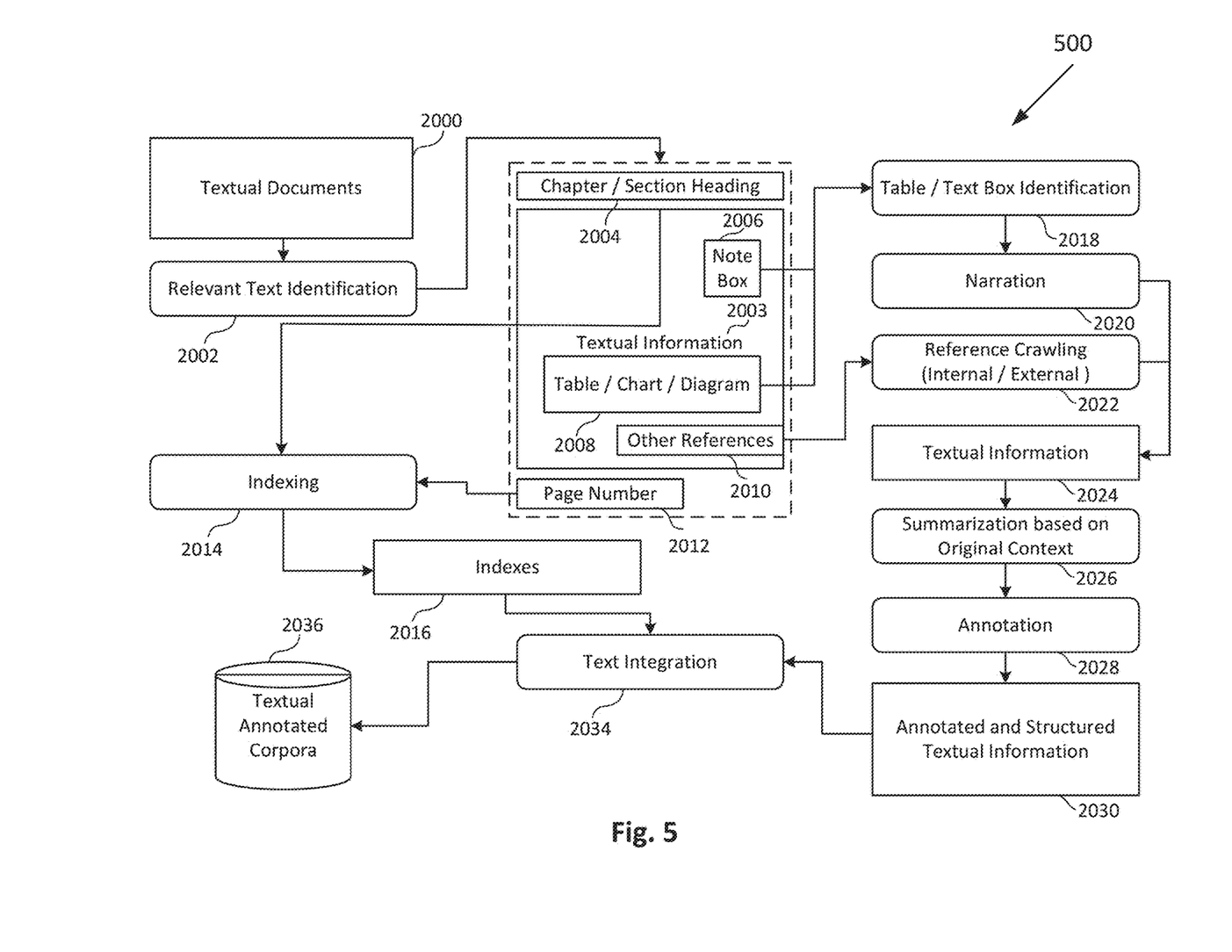
FIG. 5 illustrates a simplified diagram of exemplary types of reference identifiers in a document to external objects that may be used to generate information for a corpus of documents according to some embodiments.
Figure 6:
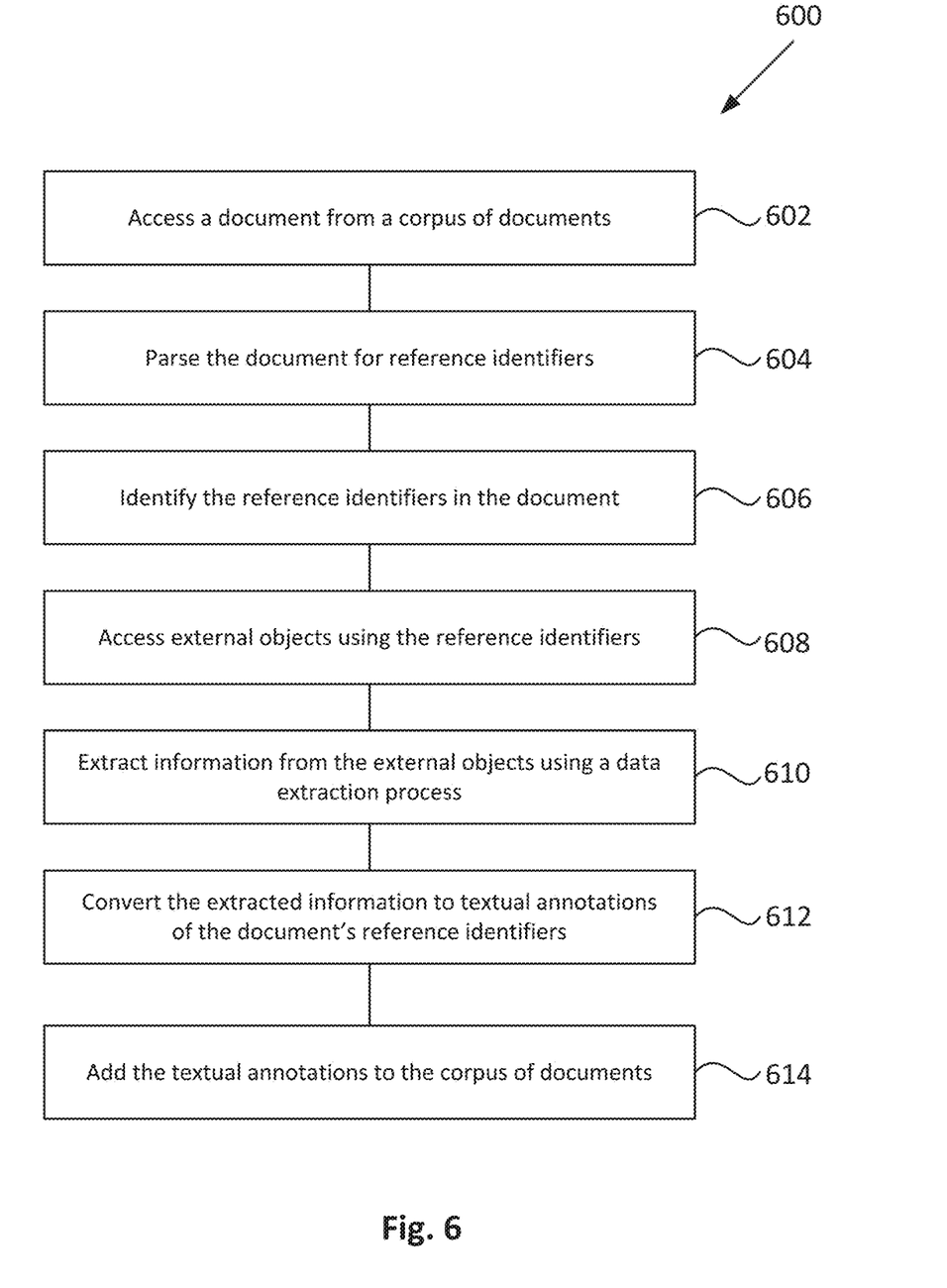
FIG. 6 illustrates a simplified diagram of a flowchart for generating textual annotations of a document based on references to external objects described in FIGS. 4A, 4B, and 5 according to some embodiments.

FIGS. 4A and 4B illustrates a simplified diagram of exemplary documents having reference identifiers to external objects according to some embodiments. FIG. 5 illustrates a simplified diagram of exemplary types of reference identifiers in a document to external objects that may be used to generate information for a corpus of documents according to some embodiments. In some embodiments, textual annotations in FIG. 5 can be an implementation of those generated by textual annotation engine 330 of computing device 300. FIG. 6 illustrates a simplified diagram of a flowchart for generating textual annotations of a document based on references to external objects described in FIGS. 4A, 4B, and 5 according to some embodiments.

One or more of the processes 602-614 of method 600 may be implemented, at least in part, in the form of executable code stored on non-transitory, tangible, machine-readable media that when run by one or more processors may cause the one or more processors to perform one or more of the processes 602-614. In some embodiments, method 600 can be performed by one or more computing devices in environment 110 of FIGS. 1 and 2.

The model of textual annotation engine 330 uses a data parsing, extracting, and converting process to perform textual annotations of documents in a database system (e.g. CRM system 116) based on references to external objects in the documents. In some embodiments, these include the documents and corpora of documents that may be standard for the database system (e.g., articles, training material, customer help requests and answers, and other documents that may be relevant to a particular database system) and provided for customers of the CRM or other system.

To accomplish this, and with reference to FIGS. 4A, 4B, 5, and 6, the method 600 starts with a process 602. At process 602, textual annotation engine 330 receives documents and other data from a database or other collection of data, such as a corpus or corpora of documents. This data may include text, images, video, audio, etc. relating to one or more documents or other objects within a database that may be searched by other users to locate some specific document or portion of a document (or other data, such as image or audio file). In some embodiments, the data can be developed from a raw input dataset obtained from objects in the database, which may be over a specific period of time, and processed into a dataset (e.g., a corpus of documents associated with a database, subject, user, etc.) for textual annotation engine 330. For example, at chart 500, textual documents 2000 are identified, where relevant text 2002 from the textual documents is then determined for processing. Examples of this are illustrated in FIGS. 4A and 4B.

In FIGS. 4A and 4B, a document 1000 and a document 1100, respectively, are shown, which may be documents from a database that are searchable using a search engine or other search process. Documents 1000 and 1100 include text, images, and other data that may be relevant to users. Additionally, documents 1000 and 1100 include reference identifiers to external objects that are not include directly in documents 1000 and 1100, or the reference identifiers refer to another portion of the document that is not included in the portion of the document having the reference identifier (e.g., the external object is elsewhere in the document, such as a page reference, appendix, footnote, etc. that including additional information). At process 604, the document is parsed for these reference identifiers, for example, using optical character recognition (OCR), image processing, or other technique to identify a reference identifier. Such techniques may identify reference identifiers through similarity to other reference identifiers used to train the parsing and identification process. Exemplary portions of a document that may be parsed and/or generated into textual annotations of textual information 2003 are shown in chart 500, including textual information 2003 itself, chapter/section heading 2004, a note box 2006, a table/chart/diagram 2008, other references 2010, and/or a page number 2012. However, it is understood that different formats and/or groupings are possible. Further, without loss of generality, the processing is described with respect to text; however, other data may also be used.

Generally, chapter/section heading 2004 and page number 2012 may be used for an indexing process 2014 to generate indexes 2016 of textual annotations for a document based on references to external objects. However, the content located at reference identifiers may be required to be identified, extracted, and converted to text to further annotate the document within the corpora. Reference identifiers may correspond to any reference, link, or direction to an object external to at least a portion of the document, such as a hyperlink, a page identifier, a heading, a location identifier, an image identifier, a callout banner, or a table number. For example, in document 1000 of FIG. 4A, content 1002 is parsed to identify a link or reference to table locator 1004 for table content 1006. Similarly, in document 1100 of FIG. 4B, content 1102 is parsed to identify a link identifier 1104 to a text box 1106. Thus, the reference identifiers in the document are identified from the parsing at process 606.

Using the reference identifiers, at process 608, the external objects are accessed using the reference identifiers. In some embodiments, this may include navigation to a website or specific webpage link, routing or navigation to a separate portion of the document or another document having the external object, matching the identifier to a page, text box, section, or other portion of the document or other document, or otherwise locating the external object that is not contained with the document itself or the portion of the document having the reference identifier. For example, in document 1000, selection of table locator or use of table locator may allow the engine to access or retrieval table content 1006. Similarly, in document 1100, link identifier 1104 allows for navigation to text box 1106 in another portion of document 1100. The accessing of the external objects may be done through a data recognition process to determine where the reference identifier is pointing to, such as OCR or image recognition/processing, which allows textual annotation engine 330 to determine the location of the external object. In other embodiments, navigation may be done through data processing, link selection, and the like.

Once the external objects have been accessed, information from the external objects are extracted using a data extraction process, at process 610. The data extraction process may utilize information retrieval through metadata searches or full-text, image, etc., searches and processing in order to extract data from the external objects. For example, extracted data may include text (e.g., words, sentences, etc.), images, video/audio, or other content contained within the external object. The data may also retrieve or request data within another resource, such as from a website or located within a database associated with the external object.

In order to provide textual annotation of documents within a corpus or corpora of documents, the data and information from the external objects may be converted to text so that the text can be associated with or otherwise used to annotate sections of the documents having the reference identifiers to the external objects. This allows the external objects to be searched along with the portions of the documents having references to those external objects, thereby including their text directly in searches of the documents. Thus, at process 612, the extracted information is converted to textual annotations of the document's reference identifiers. The conversion process may first convert all information from the external objects to text or textual identifiers and other searchable text (including natural language as well as character, word, or phrase vectors for a machine learning engine). The textual annotations may correspond to a note, comment, tag, link, or interaction with the document so that a portion of the document is annotated, specifically with the data from the external object. For example, a searchable text box converted to a textual annotation may be added to or otherwise associated with the portion of the document having the reference identifier (e.g., by annotating that reference identifier) such that when that portion is searched, the data converted from the external object is also searched.

For example, in chart 500, external objects are determined and retrieved based on their reference identifiers. Note box 2006, table/chart/diagram 2008, and/or other references 2010 may all correspond to external objects and/or references to those external objects. When processing note box 2006 referred to within textual information 2003, table/text box identification 2018 may occur through parsing of textual information 2003. Narration 2020 or other data extraction process of note box 2006 may result in textual information 2024 after conversion of the data to text. In addition to data from note box 2006, table/chart/diagram 2008 may be processed with a reference crawling process 2022 with internal and/or external data to extract data added to textual information 2024. Other references 2010 may also be processed through reference crawling process 2022 to add additional data to textual information 2024. Based on textual information from a note box 2006, a table/chart/diagram 2008, and other references 2010, a summarization 2026 is performed based on the original content. This allows for annotation 2028 to occur of textual information 2003 from textual documents 2000. Annotation 2028 results in generating annotated and structured textual information 2030.

Textual integration 2034 may be performed through a natural language processing framework or through another process, including machine learning processes to integrate the textual annotations with the document and/or portions of the document associated with the reference identifier(s), thereby enriching the corpora of documents with textual annotations. Thus, with process 614, textual annotated corpora 2036 is generated, which corresponds to the corpora of documents with textual annotations of data from external objects referred to within the documents. Textual integration 2034 may occur with indexes 2016 as well as the annotated and structured textual information 2030 from the external objects' data to annotate documents in the corpora.

Further after process 514, a neural network model may be trained on the textual annotated corpora 2036. In some embodiments, for training, the neural network may perform pre-processing on training data from textual annotated corpora 2036, for example, for each word, portion of a word, or character in a training text. The embeddings are encoded, for example, with one or more encoding layers of the neural network to generate respective vectors. A pre-processing layer generates an embedding for each word in the text input sequence. Each embedding can be a vector. In some embodiments, these can be word embeddings, such as obtained, for example, by running methods like word2vec, FastText, or GloVe, each of which defines a way of learning word vectors with useful properties. In some embodiments, pre-trained vectors of a certain dimensionality may be used. In some embodiments, the embedding may include partial word embeddings related to portions of a word. For example, the word "where" includes portions "wh," "whe," "her," "ere," and "re." Partial word embeddings can help to enrich word vectors with subword information/FastText. Similarly, when applying the pre-processing layer to words and/or phrases from textual annotated corpora 2036 (including textual annotations), a sequence of word vectors may be generated based on the sequences of words within the documents and textual annotations. In some instances, a text input sequence, e.g., used for training, may comprise few words, in which case, the embeddings output from the pre-processing layer can be "padded," e.g., with zeros. A mask layer masks such numbers so that they are ignored or not processed in subsequent layers, for example, to help reduce training time.

The encoding layers learn high-level features from the words of textual input sequence. Each encoding layer generates encodings (e.g., vectors) which map the words in the text input sequence to a higher dimensional space. The encodings can encode the semantic relationship between words. In some embodiments, the encoding layers or encoder stack is implemented with a recurrent neural network (RNN). RNNs are deep learning models that process vector sequences of variable length. This makes RNNs suitable for processing sequences of word vectors. In some embodiments, the encoding layers can be implemented with one or more gated recurrent units (GRUs). A GRU is a specific model of recurrent neural network (RNN) that intends to use connections through a sequence of nodes to perform machine learning of tasks. GRUs help to adjust the neural network input weights to solve the vanishing gradient problem that is common issue with RNNs. In some embodiments, encoding layers can be implemented with one or more long-term short-term memory (LSTM) encoders.

A plurality of the GRUs may be arranged in rows. A first row of the GRUs looks at or operates on information (e.g., embeddings or encodings) for respective words in the text input sequence in a first (e.g., "forward") direction, with each GRU generating a corresponding state vector and passing that vector along to the next GRU in the row (e.g., as indicated by the arrows pointing from left to right). A second row of GRUs looks at or operates on information (e.g., embeddings or encodings) for respective words in the input sequence in a second (e.g., "backward") direction, with each GRU generating a corresponding hidden state vector and passing that vector along to the next GRU in the row. The weights (values) of the embedding matrix may be initialized at random and/or separately and updated/learned using back-propagation at training time.

According to some embodiments, embeddings may be learned end-to-end while training the machine learning engine and/or neural network model (with other features) on its classification task. The training will result in having one vector per character, word, phrase, or sentence, and cluster the vectors. For instance, two characters, words, phrases, or sentences having similar embeddings will end up having similar vectors, closer than distant embeddings. The embeddings are then flattened at a respective flattener and/or concatenated at a respective concatenator.

The model of the neural network is trained using the concatenated features or vectors. For training, the neural network may include or be implemented with a multi-layer or deep neural network or neural model, having one or more layers. According to some embodiments, examples of multi-layer neural networks include the ResNet-32, DenseNet, PyramidNet, SENet, AWD-LSTM, AWD-QRNN and/or the like neural networks. The ResNet-32 neural network is described in further detail in He, et al., "Deep Residual Learning for Image Recognition," arXiv:1512.03385, submitted on Dec. 10, 2015; the DenseNet neural network is described in further detail in Iandola, et al., "Densenet: Implementing Efficient Convnet Descriptor Pyramids," arXiv:1404.1869, submitted Apr. 7, 2014, the PyramidNet neural network is described in further detail in Han, et al., "Deep Pyramidal Residual Networks," arXiv:1610.02915, submitted Oct. 10, 2016; the SENet neural network is described in further detail in Hu, et al., "Squeeze-and-Excitation Networks," arXiv:1709.01507, Sep. 5, 2017; the AWD-LSTM neural network is described in further detail in Bradbury, et al., "Quasi-Recurrent Neural Networks," arXiv:1611.01576, submitted on Nov. 5, 2016; each of which are incorporated by reference herein.

Each neural network layer can operate or process the features or vectors, performing, for example, regularization (e.g., L2 and L1 regularization, Early stopping, etc.), normalization, and activation. In some embodiments, each neural network layer may include a dense layer, batch normalization, and a dropout for deep learning. In some embodiments, a respective rectifier linear unit (ReLU) at the end of each layer performs a ReLU activation function. An output layer of the neural network performs a softmax function to produce or generate one single model for all contexts. The global model predicts case objects for present queries or a test case object into a database system, such as system 116. In some embodiments, the model comprises or represents a probability distribution for embeddings within a document and/or textual annotation (whether standard or custom) with respect to a given training document and/or textual annotation (e.g., corpus or corpora of documents with textual annotations based on referral objects). For the distribution, each embedding has a corresponding numerical value representing or indicative of the relevance of that such embedding to the present search. In some embodiments, the softmax layer can be implemented with a high-rank language model, called Mixture of Softmaxes (MoS), to alleviate softmax bottleneck issues.

As discussed above and further emphasized here, FIGS. 3, 4A, 4B, 5, and 6 are merely examples of a textual annotation engine 330 and corresponding method 600 for training and use which should not unduly limit the scope of the claims. One of ordinary skill in the art would recognize many variations, alternatives, and modifications.

Some examples of computing devices, such as computing device 300, may include non-transitory, tangible, machine readable media that include executable code that when run by one or more processors (e.g., processor 310) may cause the one or more processors to perform the processes of method 600. Some common forms of machine readable media that may include the processes of method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A system for referral object processing for textual annotations, the system comprising:
   a memory storing machine executable code; and
   one or more processors coupled to the memory and configurable to execute the machine executable code to cause the one or more processors to:
      parse a document for a reference identifier to an external object, the external object associated with information not contained in the document, wherein parsing the document comprises:

performing optical character recognition on the document, identifying, using a neural network model, the reference identifier based on a calculated similarity value determined from comparing data from the optical character recognition to one or more reference identifiers used to train the neural network model, and determining a portion of the document that corresponds to a location within the document where the reference identifier is identified, wherein the portion references the external object using the reference identifier, retrieve the external object using the reference identifier from parsing the document;

extract the information associated with the external object based on at least one data pattern detected in the external object;

convert the extracted information into the textual annotations associated with the reference identifier in the document;

combine the textual annotations with the portion of the document in a corpus of content so that the extracted information is associated with the reference identifier in the portion of the document by the system, wherein combining comprises integrating, using a natural language processing framework, the textual annotation with text from the portion of the document;

convert the textual annotations to first word embeddings for a machine learning model of a machine learning engine used to search the corpus of content including the document; and combine the first word embeddings with second word embeddings of the portion of the document having the reference identifier, wherein the machine learning model previously comprises the second word embeddings.

2. The system of claim 1, wherein the reference identifier comprises one of a hyperlink, a page identifier, a heading, a location identifier, an image identifier, a callout banner, or a table number.

3. The system of claim 1, wherein the machine executable code further causes the one or more processors to:

train the machine learning model of the machine learning engine using the first word embeddings and the second word embeddings from at least the document and the textual annotations.

4. The system of claim 1, wherein the machine executable code further causes the one or more processors to:

execute, using the machine learning engine, a search of the corpus of content based on a received search query, wherein the search is performed using at least the document and the textual annotations.

5. The system of claim 4, wherein the machine executable code further causes the one or more processors to:

in response to the search, determine a portion of the document identified by the search comprises one of the textual annotations; and provide the information associated with the external object based on the portion comprising the one of the textual annotations.

6. The system of claim 1, wherein the textual annotations comprise searchable text generated using the information not contained within the document, and wherein the searchable text is associated with a portion of the document having the reference identifier in the corpus of content.

7. The system of claim 1, wherein the information is extracted using at least one of natural language processing, image processing, further optical character recognition, or website data extraction.

8. A method for referral object processing for textual annotations, the method comprising:

parsing a document for a reference identifier to an external object, the external object associated with information not contained in the document, wherein parsing the document comprises:

performing optical character recognition on the document, identifying, using a neural network model, the reference identifier based on a calculated similarity value determined from comparing data from the optical character recognition to one or more reference identifiers used to train the neural network model, and determining a portion of the document that corresponds to a location within the document where the reference identifier is identified, wherein the portion references the external object using the reference identifier, retrieving the external object using the reference identifier from parsing the document;

extracting the information associated with the external object based on at least one data pattern detected in the external object;

converting the extracted information into the textual annotations associated with the reference identifier in the document;

combining the textual annotations with the portion of the document in a corpus of content so that the extracted information is associated with the reference identifier in the portion of the document, wherein combining comprises integrating, using a natural language processing framework, the textual annotation with text from the portion of the document;

converting the textual annotations to first word embeddings for a machine learning model of a machine learning engine used to search the corpus of content including the document; and combining the first word embeddings with second word embeddings of the portion of the document having the reference identifier, wherein for the machine learning model previously comprises the second word embeddings.

9. The method of claim 8, wherein the reference identifier comprises one of a hyperlink, a page identifier, a heading, a location identifier, an image identifier, a callout banner, or a table number.

10. The method of claim 8, further comprising:

training the machine learning model of the machine learning engine using the first word embeddings and the second word embeddings from at least the document and the textual annotations.

11. The method of claim 8, further comprising:

executing, using the machine learning engine, a search of the corpus of content based on a received search query, wherein the search is performed using at least the document and the textual annotations.

12. The method of claim 11, further comprising:

in response to the search, determining a portion of the document identified by the search comprises one of the textual annotations; and providing the information associated with the external object based on the portion comprising the one of the textual annotations.

13. The method of claim 8, wherein the textual annotations comprise searchable text generated using the information not contained within the document, and wherein the searchable text is associated with a portion of the document having the reference identifier in the corpus of content.

14. The method of claim 8, wherein the information is extracted using at least one of natural language processing, image processing, further optical character recognition, or website data extraction.

15. A non-transitory machine-readable medium having stored thereon instructions for performing a method comprising machine executable code which when executed by at least one machine, causes the machine to:
    parsing a document for a reference identifier to an external object, the external object associated with information not contained in the document, wherein parsing the document comprises:
        performing optical character recognition on the document, and
        identifying, using a neural network model, the reference identifier based on a calculated similarity value determined from comparing data from the optical character recognition to one or more reference identifiers used to train the neural network model, and
        determining a portion of the document that corresponds to a location within the document where the reference identifier is identified, wherein the portion references the external object using the reference identifier,
    retrieving the external object using the reference identifier from parsing the document;
    extracting the information associated with the external object based on at least one data pattern detected in the external object;
    converting the extracted information into textual annotations associated with the reference identifier in the document;
    combining the textual annotations with the portion of the document in a corpus of content so that the extracted information is associated with the reference identifier in the portion of the document, wherein combining comprises integrating, using a natural language processing framework, the textual annotation with text from the portion of the document;
    converting the textual annotations to first word embeddings for a machine learning model of a machine learning engine used to search the corpus of content including the document; and
    combining the first word embeddings with second word embeddings of the portion of the document having the reference identifier, wherein for the machine learning model previously comprises the second word embeddings.

16. The non-transitory machine-readable medium of claim 15, wherein the reference identifier comprises one of a hyperlink, a page identifier, a heading, a location identifier, an image identifier, a callout banner, or a table number.

17. The non-transitory machine-readable medium of claim 15, storing the instructions which when executed by the at least one machine, further causes the machine to:
    training the machine learning model of the machine learning engine using the first word embeddings and the second word embeddings from at least the document and the textual annotations.

18. The non-transitory machine-readable medium of claim 15, storing the instructions which when executed by the at least one machine, further causes the machine to:
    executing, using the machine learning engine, a search of the corpus of content based on a received search query, wherein the search is performed using at least the document and the textual annotations.

19. The non-transitory machine-readable medium of claim 18, storing the instructions which when executed by the at least one machine, further causes the machine to:
    in response to the search, determining a portion of the document identified by the search comprises one of the textual annotations; and
    providing the information associated with the external object based on the portion comprising the one of the textual annotations.

20. The non-transitory machine-readable medium of claim 15, wherein the textual annotations comprise searchable text generated using the information not contained within the document, and wherein the searchable text is associated with a portion of the document having the reference identifier in the corpus of content.

21. The non-transitory machine-readable medium of claim 15, wherein the information is extracted using at least one of natural language processing, image processing, further optical character recognition, or website data extraction.

* * * * *